United States Patent [19]

Miller

[11] Patent Number: 4,859,311
[45] Date of Patent: Aug. 22, 1989

[54] CATALYTIC DEWAXING PROCESS USING A SILICOALUMINOPHOSPHATE MOLECULAR SIEVE

[75] Inventor: Stephen J. Miller, San Francisco, Calif.

[73] Assignee: Chevron Research Company, San Francisco, Calif.

[21] Appl. No.: 70,492

[22] Filed: Jul. 6, 1987

Related U.S. Application Data

[63] Continuation of Ser. No. 750,388, Jun. 28, 1985, abandoned.

[51] Int. Cl.$^4$ .............................................. C10G 69/02
[52] U.S. Cl. ...................................... 208/89; 208/18; 208/49; 208/58; 208/61; 208/114; 585/740
[58] Field of Search .................. 208/18, 89, 58, 111, 208/120, 49, 114, 61; 585/740

[56] References Cited

U.S. PATENT DOCUMENTS

| | | | |
|---|---|---|---|
| 4,428,819 | 1/1984 | Shu et al. | 208/111 |
| 4,440,871 | 4/1984 | Lok et al. | 208/114 |
| 4,551,236 | 11/1985 | Lok et al. | 208/114 |
| 4,556,645 | 12/1985 | Coughlin et al. | 502/66 |
| 4,568,655 | 2/1986 | Oleck et al. | 208/111 |
| 4,686,029 | 8/1987 | Pellet et al. | 208/111 |
| 4,689,138 | 8/1987 | Miller | 208/114 |
| 4,695,368 | 9/1987 | Ward | 208/110 |
| 4,710,485 | 12/1987 | Miller | 502/66 |

FOREIGN PATENT DOCUMENTS 0185329  6/1986  European Pat. Off. ........... 208/111

OTHER PUBLICATIONS

Haggin, J.; "Aluminophosphates Broaden Shape Selective Catalyst Types", C & EN, Jun. 20, 1983.

*Primary Examiner*—Anthony McFarlane
*Attorney, Agent, or Firm*—S. R. La Paglia; T. G. De Jonghe; V. J. Cavalieri

[57] ABSTRACT

An improved process for catalytically dewaxing a hydrocarbon oil feedstock by contact of the feedstock with a catalyst is disclosed where the catalyst comprises an intermediate pore size silicoaluminophosphate molecular sieve and at least one Group VIII metal.

10 Claims, 4 Drawing Sheets

4,859,311

CATALYTIC DEWAXING PROCESS USING A SILICOALUMINOPHOSPHATE MOLECULAR SIEVE

This is a continuation of application Ser. No. 750,388, filed June 28, 1985, abandoned.

BACKGROUND OF THE INVENTION

1. Field of the Invention

This invention is concerned with a process for catalytically dewaxing a hydrocarbon oil. In particular, it is concerned with dewaxing a hydrocarbon oil feedstock by contacting the feedstock with a catalyst comprising an intermediate pore size silicoaluminophosphate molecular sieve and at least one Group VIII metal.

2. Description of the Prior Art

Processes for dewaxing petroleum distillates are well known. Dewaxing is required when highly paraffinic oils are to be used in products which need to remain mobile at low temperatures, e.g., lubricating oils, heating oils, jet fuels. The higher molecular weight straight chain normal and slightly branched paraffins which are present in oils of this kind, are waxes which are the cause of high pour points and high cloud points in the oils. If adequately low pour points are to be obtained, these waxes must be wholly or partly removed. In the past, various solvent removal techniques were used, e.g., propane dewaxing, MEK dewaxing, but these techniques are costly and time consuming. Catalytic dewaxing processes are more economical and achieve this end by selectively cracking the longer chain n-paraffins, to produce lower molecular weight products, some of which may be removed by distillation.

Because of their selectivity, prior art dewaxing catalysts generally comprise an aluminosilicate zeolite having a pore size which admits the straight chain n-paraffins either alone or with only slightly branched chain paraffins, but which excludes more highly branched materials, cycloaliphatics and aromatics. Zeolites such as ZSM-5, ZSM-11, ZSM-12, ZSM-23, ZSM-35 and ZSM-38 have been proposed for this purpose in dewaxing processes and their use is described in U.S. Pat. Nos. 3,700,585; 3,894,938; 4,176,050; 4,181,598; 4,222,855; 4,229,282 and 4,247,388.

Since dewaxing processes of this kind function by means of cracking reactions, a number of useful products become degraded to lower molecular weight materials. For example, waxy paraffins may be cracked down to butane, propane, ethane and methane and so may the lighter n-paraffins which do not, in any event, contribute to the waxy nature of the oil. Because these lighter products are generally of lower value than the higher molecular weight materials, it would obviously be desirable to limit the degree of cracking which takes place during a catalytic dewaxing process.

A dewaxing catalyst has now been found which has superior selectivity with respect to the nature of the products obtained in a dewaxing process. By use of certain silicoaluminophosphate molecular sieve catalysts in the dewaxing process, hydrocarbon oil feedstocks may be effectively dewaxed wherein the products obtained are of higher molecular weight than those obtained using the prior art aluminosilicate zeolites. Also, and especially with respect to lubricating oil feedstocks, the products obtained from the dewaxing process of this invention have better viscosities and viscosity indexes at a given pour point as compared to the above-described prior art process using aluminosilicate zeolites.

SUMMARY OF THE INVENTION

In accordance with the present invention, there has been discovered a process of catalytically dewaxing a hydrocarbon oil feedstock boiling above 350° F. and containing straight chain and slightly branched chain hydrocarbons, the improvement which comprises contacting said oil feedstock with a catalyst comprising an intermediate pore size silicoaluminophosphate molecular sieve, and at least one Group VIII metal.

The silicoaluminophosphate molecular sieves used in the process of this invention are described in U.S. Pat. No. 4,440,871, which is incorporated totally herein by reference.

It has been found that the present process provides selective conversion of waxy n-paraffins to non-waxy paraffins. During processing the waxy paraffins undergo mild cracking reactions to yield non-waxy products of higher molecular weight than compared to products obtained using the prior art zeolitic catalyst. At the same time, a measure of isomerization takes place, so that not only is the pour point reduced by reason of the cracking reactions described above, but in addition the n-paraffins become isomerized to iso-paraffins to form liquid range materials which contribute to a low viscosity, low pour point product.

Because of the selectivity of the catalyst used in the process of this invention, the gas yield is reduced, thereby preserving the economic value of the feedstock.

Hydrogen consumption using the process of this invention is less compared to prior art processes using conventional dewaxing catalysts because isomerization does not consume hydrogen and cracking to liquid range products consumes less hydrogen than cracking to gas.

DESCRIPTION OF SPECIFIC EMBODIMENTS

Feedstock

Figure 1:
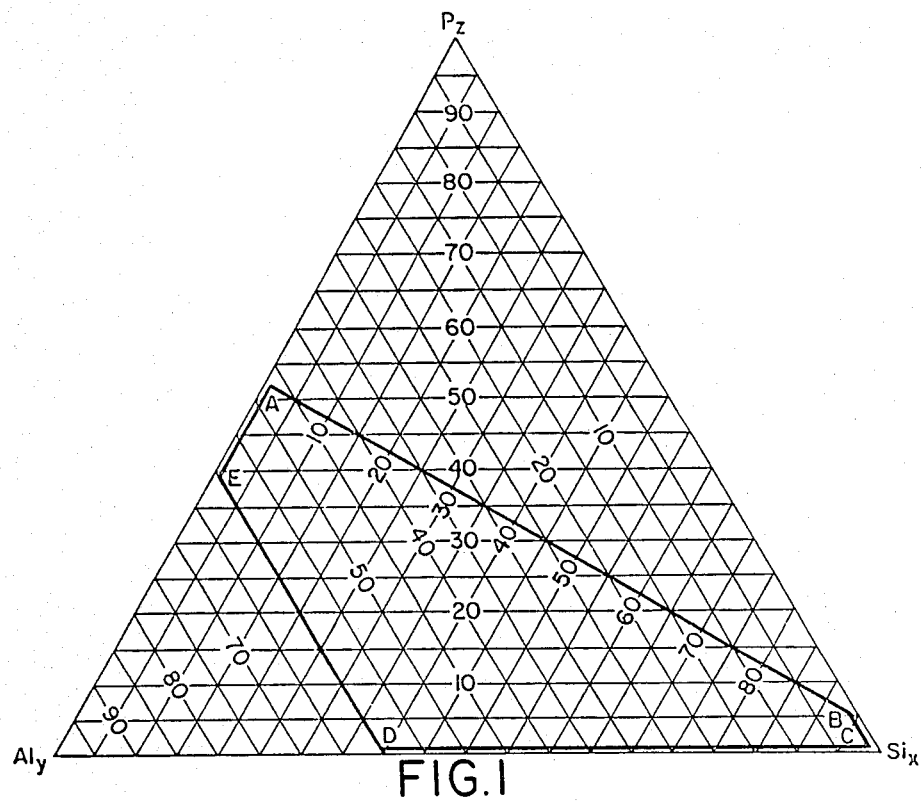
FIG. 1 is a ternary diagram showing the compositional parameters of the silicoaluminophosphates of U.S. Pat. No. 4,440,871 in terms of mole fractions of silicon, aluminum and phosphorus.

The present process may be used to dewax a variety of feedstocks ranging from relatively light distillate fractions up to high boiling stocks such as whole crude petroleum, reduced crudes, vacuum tower residua, cycle oils, synthetic crudes (e.g., shale oils, tar sand oil, etc.), gas oils, vacuum gas oils, foots oils, and other heavy oils. The feedstock will normally be a $C_{10}+$ feedstock generally boiling above about 350° F. since lighter oils will usually be free of significant quantities of waxy components. However, the process is particularly useful with waxy distillate stocks such as middle distillate stocks including gas oils, kerosenes, and jet fuels, lubricating oil stocks, heating oils and other distillate fractions whose pour point and viscosity need to be maintained within certain specification limits. Lubricating oil stocks will generally boil above 230° C. (450° F.), more usually above 315° C. (600° F.). Hydroprocessed stocks are a convenient source of stocks of this kind and also of other distillate fractions since they normally contain significant amounts of waxy n-paraffins. The feedstock of the present process will normally be a $C_{10}+$ feedstock containing paraffins, olefins, naphthenes, aromatics and heterocyclic compounds and with a substantial proportion of higher molecular weight n-paraffins and slightly branched paraffins which contribute to the waxy nature of the feedstock. During the processing, the n-paraffins and the slightly branched paraffins undergo some cracking or hydrocracking to form liquid range materials which contribute to a low viscosity product. The degree of cracking which occurs is, however, limited so that the gas yield is reduced, thereby preserving the economic value of the feedstock.

Typical feedstocks include light gas oils, heavy gas oils and reduced crudes boiling above 350° F.

While the process herein can be practiced with utility when the feed contains organic nitrogen (nitrogen-containing impurities), it is preferred that the organic nitrogen content of the feed be less than 50, more preferably less than 10, ppmw. Especially good results, in terms of activity and length of catalyst cycle (period between successive regenerations or start-up and first regeneration), are experienced when the feed contains less than 10 ppmw of organic nitrogen.

SILICOALUMINOPHOSPHATE CATALYSTS COMPOSITIONS (SAPOs)

Silicoaluminophosphate molecular sives (SAPOs) suitable for use in the instant process comprise any molecular sieve having a silicoaluminophosphate molecular framework which has an intermediate pore size and which comprises a molecular framework of corner-sharing $[SiO_2]$ tetrahedra, $[AlO_2]$ tetrahedra and $[PO_2]$ tetrahedra, [i.e., $(Si_xAl_yP)O_2$ tetrahedral units], and which functions to convert at effective process conditions the aforementioned feedstock to dewaxed products and includes those silicoaluminophosphate molecular sieves described in U.S. Pat. No. 4,440,871 which is incorporated herein by reference.

The preferred intermediate pore size SAPOs are characterized as comprising a three-dimensional microporous crystal framework structure of $[SiO_2]$, $[AlO_2]$ and $[PO_2]$ tetrahedral units which has a unit empirical formula on a anhydrous basis of:

wherein "R" represents at least one organic templating agent (hereinafter also referred to as "template") present in the intracrystalline pore system; "m" represents the moles of "R" present per mole of $(Si_xAl_yP_z)O_2$ and has a value from zero (0) to about 0.3, with the maximum value of m being related at least in part, to the molecular dimensions of the template and the void volume of the intracrystalline pore system of the particular SAPO; "x", "y" and "z" represent the mole fractions of silicon, aluminum and phosphorus, respectively, present as tetrahedral oxide units, said mole fractions being within the pentagonal compositional area defined by points A, B, C, D and E of the ternary compositional diagram depicted by FIG. 1 of the drawings where the points A, B, C, D and E are represented by the following values for "x", "y" and "z":

| | Mole Fraction | | |
|---|---|---|---|
| Point | x | y | z |
| A | 0.01 | 0.47 | 0.52 |
| B | 0.94 | 0.01 | 0.05 |
| C | 0.98 | 0.01 | 0.01 |
| D | 0.39 | 0.60 | 0.01 |
| E | 0.01 | 0.60 | 0.39 |

Figure 2:
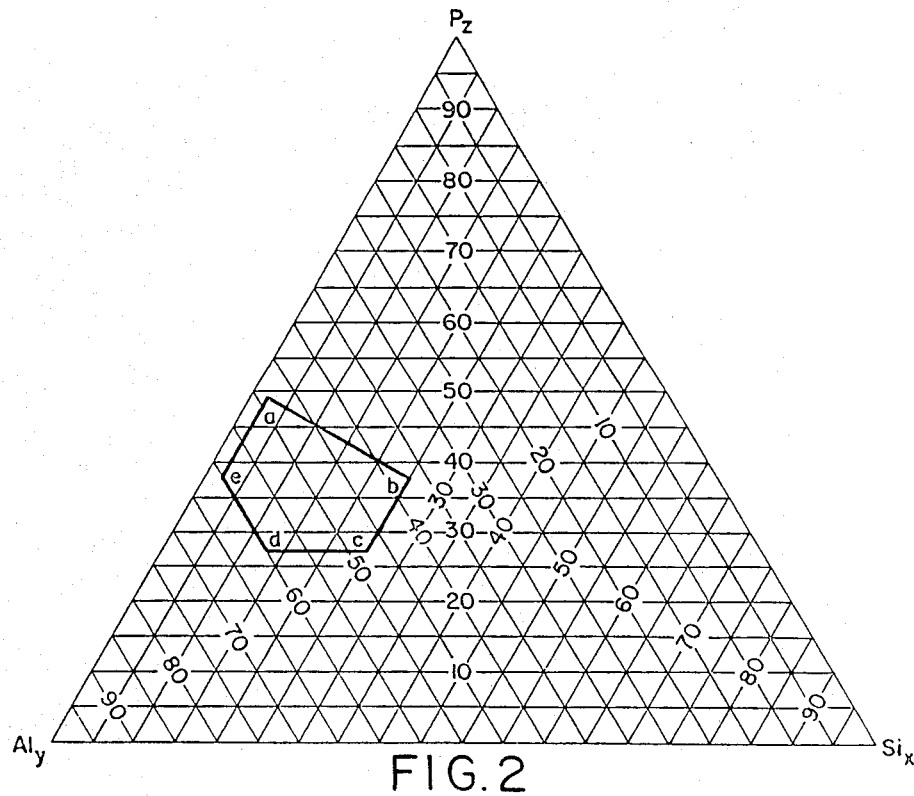
FIG. 2 is a ternary diagram showing the preferred compositional parameters of the silicoaluminophosphates of mole fractions of silicon, aluminum and phosphorus.

A preferred sub-class of the SAPOs of Formula (1), above, have a minimum value of "m" of 0.02 in the assynthesized form and have the values of "x", "y", and "z" within the pentagonal compositional area defined by the points a, b, c, d, and e of the ternary diagram which is FIG. 2 of the drawings, wherein said points a, b, c, d, and e are represented by the following values of "x", "y" and "z":

| | Mole Fraction | | |
|---|---|---|---|
| Point | x | y | z |
| a | 0.02 | 0.49 | 0.49 |
| b | 0.25 | 0.37 | 0.38 |
| c | 0.25 | 0.48 | 0.27 |
| d | 0.13 | 0.60 | 0.27 |
| e | 0.02 | 0.60 | 0.38 |

The term "unit empirical formula" is used herein according to its common meaning to designate the simplest formula which gives the relative number of atoms of silicon, aluminum and phosphorus which form a $[PO_2]$, $[AlO_2]$ and $[SiO_2]$ tetrahedral unit within a silicoaluminophosphate molecular sieve and which forms the molecular framework of the SAPO composition(s). The unit empirical formula is given in terms of silicon, aluminum and phosphorus as shown in Formula (1), above, and does not include other compounds, cations or anions which may be present as a result of the SAPO's preparation or the existence of other impurities or materials in the bulk composition not containing the aforementioned tetrahedral unit as the molecular framework. The amount of template R is reported as part of the composition when the assynthesized unit empirical formula is given, and water may also be reported unless such is defined as the anhydrous form. For convenience, coefficient "m" for template "R" is reported as a value that is normalized by dividing the number of moles of R by the total number of moles of silicon, phosphorus and aluminum. When moles of water are reported the moles of water relative to the mole fractions of silicon, aluminum and phosphorus is reported as a value that is normalized by dividing the number of moles of water by the total moles of silicon, phosphorus and aluminum. The values of x, y and z are determined by dividing the number of moles of silicon, aluminum and phosphorus individually by the total number of moles of silicon, aluminum and phosphorus.

The unit empirical formula for a SAPO may be given on an "as-synthesized" basis or may be given after an "as-synthesized" SAPO composition has been subjected to some post treatment process, e.g., calcined. The term "as-synthesized" herein shall be used to refer to the SAPO composition(s) formed as a result of the hydrothermal crystallization but before the SAPO composition has been subjected to post treatment to remove any volatile components present therein. The actual value of "m" for a post-treated SAPO will depend on several factors (including: the particular SAPO, template, severity of the post-treatment in terms of its ability to remove the template from the SAPO, the proposed application of the SAPO composition, and etc.) and the value for "m" can be within the range of values as defined for the assynthesized SAPO compositions although such is generally less than the as-synthesized SAPO unless such post-treatment process adds template to the SAPO so treated. A SAPO composition which is in the calcined or other post-treated form generally has an empirical formula represented by Formula (1), except that the value of "m" is generally less than about 0.02. Under sufficiently severe post-treatment conditions, e.g., roasting in air at high temperature for long periods (over 1 hr.), the value of "m" may be zero (0) or, in any event, the template, R, is undetectable by normal analytical procedures.

The above silicoaluminophosphates are generally synthesized by hydrothermal crystallization from a reaction mixture comprising reactive sources of silicon, aluminum and phosphorus, and one or more organic templating agents. Optionally, alkali metal(s) may be present in the reaction mixture. The reaction mixture is placed in a sealed pressure vessel, preferably lined with an inert plastic material, such as polytetrafluoroethylene, and heated, preferably under autogenous pressure at a temperature of at least about 100° C., and preferably between 100° C. and 250° C., until crystals of the silicoaluminophosphate product are obtained, usually for a period of from 2 hours to 2 weeks. While not essential to the synthesis of SAPO compositions, it has been found that in general stirring or other moderate agitation of the reaction mixture and/or seeding the reaction mixture with seed crystals of either the SAPO to be produced, or a topologically similar composition, facilitates the crystallization procedure. The product is recovered by any convenient method such as centrifugation or filtration.

After crystallization the SAPO may be isolated and washed with water and dried in air. As a result of the hydrothermal crystallization, the as-synthesized SAPO contains within its intracrystalline pore system at least one form of the template employed in its formation. Generally, the template is a molecular species, but it is possible, steric considerations permitting, that at least some of the template is present as a charge-balancing cation. Generally the template is too large to move freely through the intracrystalline pore system of the formed SAPO and may be removed by a post-treatment process, such as by calcining the SAPO at temperatures of between about 200° C. and to about 700° C. so as to thermally degrade the template or by employing some other post-treatment process for removal of at least part of the template from the SAPO. In some instances the pores of the SAPO are sufficiently large to permit transport of the template, and, accordingly, complete or partial removal thereof can be accomplished by conventional desorption procedures such as carried out in the case of zeolites.

The SAPOs are preferably formed from a reaction mixture having a mole fraction of alkali metal cation which is sufficiently low that it does not interfere with the formation of the SAPO composition. Although the SAPO compositions will form if alkali metal cation are present, such reaction mixtures are not generally preferred. A reaction mixture, expressed in terms of molar oxide ratios, having the following bulk composition is preferred:

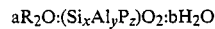

$$aR_2O:(Si_xAl_yP_z)O_2:bH_2O$$

wherein "R" is a template; "a" has a value great enough to constitute an effective concentration of "R" and is within the range of from greater than zero (0) to about 3; "b" has a value of from zero to 500; "x", "y" and "z" represent the mole fractions, respectively of silicon, aluminum and phosphorus wherein x, y and z each have a value of at least 0.01. The reaction mixture is preferably formed by combining at least a portion of the reactive aluminum and phosphorus sources in the substantial absence of the silicon source and thereafter combining the resulting reaction mixture comprising the aluminum and phosphorus sources with the silicon source. When the SAPOs are synthesized by this method the value of "m" in Formula (1) is generally above about 0.02.

Though the presence of alkali metal cations are not preferred, when they are present in the reaction mixture it is preferred to first admix at least a portion of each of the aluminum and phosphorus sources in the substantial absence of the silicon source. This procedure avoids adding the phosphorus source to a highly basic reaction mixture containing the silicon and aluminum source.

The reaction mixture from which these SAPOs are formed contain one or more organic templating agents (templates) which can be most any of those heretofore proposed for use in the synthesis of aluminosilicates. The template preferably contains at least one element of Group VA of the Periodic Table, particularly nitrogen, phosphorus, arsenic and/or antimony, more preferably nitrogen or phosphorus and most preferably nitrogen. The template contains at least one alkyl, aryl, araalkyl, or alkylaryl group. The template preferably contains from 1 to 8 carbon atoms, although more than eight carbon atoms may be present in the template. Nitrogen-containing templates are preferred, including amines and quaternary ammonium compounds, the latter being represented generally by the formula $R'_4N+$ wherein each R' is an alkyl, aryl, alkylaryl, or araalkyl group; wherein R' preferably contains from 1 to 8 carbon atoms or higher when R' is alkyl and greater than 6 carbon atoms when R' is otherwise, as hereinbefore discussed. Polymeric quaternary ammonium salts such as $[(C_{14}H_{32}N_2)(OH)_2]_x$ wherein "x" has a value of at least 2 may also be employed. The mono-, di- and triamines, including mixed amines, may also be employed as templates either alone or in combination with a quaternary ammonium compound or another template.

Representative templates, phosphorus, aluminum and silicon sources as well as detailed process conditions are more fully described in U.S. Pat. No. 4,440,871, which is incorporated totally herein by reference.

By "intermediate pore size", as used herein, is meant an effective pore aperture in the range of about 5.3 to 6.5 Angstroms when the molecular sieve is in the calcined form. Molecular sieves having pore apertures in this range tend to have unique molecular sieving characteristics. Unlike small pore zeolites such as erionite and chabazite, they will allow hydrocarbons having some branching into the molecular sieve void spaces. Unlike larger pore zeolites such as the faujasites and mordenites, they can differentiate between n-alkanes and slightly branched alkanes on the one hand and larger branched alkanes having, for example, quaternary carbon atoms.

The effective pore size of the molecular sieves can be measured using standard adsorption techniques and hydrocarbonaceous compounds of known minimum kinetic diameters. See Breck, *Zeolite Molecular Sieves,* 1974 (especially Chapter 8); Anderson et al., J. Catalysis 58, 114 (1979); and U.S. Pat. No. 4,440,871, all of which are incorporated herein by reference.

Intermediate pore size molecular sieves will typically admit molecules having kinetic diameters of 5.3 to 6.5 Angstroms with little hindrance. Examples of such compounds (and their kinetic diameters in Angstroms) are: n-hexane (4.3), 3-methylpentane (5.5), benzene (5.85), and toluene (5.8). Compounds having kinetic diameters of about 6 to 6.5 Angstroms can be admitted into the pores, depending on the particular sieve, but do not penetrate as quickly and in some cases are effectively excluded. Compounds having kinetic diameters in the range of 6 to 6.5 Angstroms include: cyclohexane (6.0), 2,3-dimethylbutane (6.1), and m-xylene (6.1). Generally, compounds having kinetic diameters of greater than about 6.5 Angstroms do not penetrate the pore apertures and thus are not absorbed into the interior of the molecular sieve lattice. Examples of such larger compounds include: o-xylene (6.8), 1,3,5-trimethylbenzene (7.5), and tributylamine (8.1).

The preferred effective pore size range is from about 5.5 to about 6.2 Angstroms.

In performing adsorption measurements to determine pore size, standard techniques are used. It is convenient to consider a particular molecule as excluded if it does not reach at least 95% of its equilibrium adsorption value on the molecular sieve in less than about 10 minutes (p/po=0.5; 25° C.).

The preferred intermediate pore size silicoaluminophosphate molecular sieves which are useful in the process of this invention include SAPO-11, SAPO-31 and SAPO-41 and are described in U.S. Pat. No. 4,440,871, which is incorporated herein by reference.

More specifically, SAPO-11, as referred to herein, comprises a silicoaluminophosphate material having a three-dimensional microporous crystal framework structure of [PO$_2$], [AlO$_2$] and [SiO$_2$] tetrahedral units whose unit empirical formula on an anhydrous basis is:

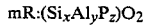

wherein "R" represents at least one organic templating agent present in the intracrystalline pore system; "m" represents the moles of "R" present per mole of (Si$_x$Al$_y$P$_z$)O$_2$ and has a value from zero to about 0.3, "x", "y" and "z" represent respectively, the mole fractions of silicon, aluminum and phosphorus, said mole fractions being within the compositional area bounded by points A, B, C, D and E on the ternary diagram which is FIG. 1 or preferably within the area bounded by points a, b, c, d and e on the ternary diagram which is FIG. 2, and said silicoaluminophosphate having a characteristic X-ray powder diffraction pattern which contains at least the d-spacings (as-synthesized and calcined) set forth below in Table I. When SAPO-11 is in the as-synthesized form "m" preferably has a value of from 0.02 to 0.3.

TABLE I

| 2θ | d | Relative Intensity |
|---|---|---|
| 9.4–9.65 | 9.41–9.17 | m |
| 20.3–20.6 | 4.37–4.31 | m |
| 21.0–21.3 | 4.23–4.17 | vs |
| 22.1–22.35 | 4.02–3.99 | m |
| 22.5–22.9 (doublet) | 3.95–3.92 | m |
| 23.15–23.35 | 3.84–3.81 | m–s |

All of the as-syntesized SAPO-11 compositions for which X-ray powder diffraction data have been obtained to date have patterns which are within the generalized pattern of the Table II below.

TABLE II

| 2θ | d | 100 × I/I$_o$ |
|---|---|---|
| 8.05–8.3 | 10.98–10.65 | 20–42 |
| 9.4–9.65 | 9.41–9.17 | 36–58 |
| 13.1–13.4 | 6.76–6.61 | 12–16 |
| 15.6–15.85 | 5.68–5.59 | 23–38 |
| 16.2–16.4 | 5.47–5.40 | 3–5 |
| 18.95–19.2 | 4.68–4.62 | 5–6 |
| 20.3–20.6 | 4.37–4.31 | 36–49 |
| 21.0–21.3 | 4.23–4.17 | 100 |
| 22.1–22.35 | 4.02–3.99 | 47–59 |
| 22.5–22.9 (doublet) | 3.95–3.92 | 55–60 |
| 23.15–23.35 | 3.84–3.81 | 64–74 |
| 24.5–24.9 (doublet) | 3.63–3.58 | 7–10 |
| 26.4–26.8 (doublet) | 3.38–3.33 | 11–19 |
| 27.2–27.3 | 3.28–3.27 | 0–1 |
| 28.3–28.5 (shoulder) | 3.15–3.13 | 11–17 |
| 28.6–28.85 | 3.121–3.094 | |
| 29.0–29.2 | 3.079–3.058 | 0–3 |
| 29.45–29.65 | 3.033–3.013 | 5–7 |
| 31.45–31.7 | 2.846–2.823 | 7–9 |
| 32.8–33.1 | 2.730–2.706 | 11–14 |
| 34.1–34.4 | 2.629–2.607 | 7–9 |
| 35.7–36.0 | 2.515–2.495 | 0–3 |
| 36.3–36.7 | 2.475–2.449 | 3–4 |
| 37.5–38.0 (doublet) | 2.398–2.368 | 10–13 |
| 39.3–39.55 | 2.292–2.279 | 2–3 |
| 40.3 | 2.238 | 0–2 |
| 42.2–42.4 | 2.141–2.132 | 0–2 |
| 42.8–43.1 | 2.113–2.099 | 3–6 |
| 44.8–45.2 (doublet) | 2.023–2.006 | 3–5 |
| 45.9–46.1 | 1.977–1.969 | 0–2 |
| 46.8–47.1 | 1.941–1.929 | 0–1 |
| 48.7–49.0 | 1.870–1.859 | 2–3 |
| 50.5–50.8 | 1.807–1.797 | 3–4 |
| 54.6–54.8 | 1.681–1.675 | 2–3 |
| 55.4–55.7 | 1.658–1.650 | 0–2 |

SAPO-31, as referred to herein, comprises a silicoaluminophosphate having a three-dimensional microporous crystal framework of [PO$_2$], [AlO$_2$] and [SiO$_2$] tetrahedral units whose unit empirical formula on an anhydrous basis is:

wherein R represents at least one organic templating agnet present in the intracrystalline pore system; "m" represents the moles of "R" present per mole of (Si$_x$Al$_y$P$_z$)O$_2$ and has a value of from zero to 0.3; "x", and "y" and "z" represent respectively, the mole fractions of silicon, aluminum and phosphorus, said mole fractions being within the compositional area bounded by points A, B, C, D and E on the ternary diagram which is FIG. 1, or preferably within the area bounded by points a, b, c, d and e on the ternary diagram which is FIG. 2, said silicoaluminophosphate having a characteristic X-ray powder diffraction pattern (as-synthesized and calcined) which contains at least the d-spacings set forth below in Table III. When SAPO-31 is in the as-synthesized form "m" preferably has a value of from 0.02 to 0.3.

TABLE III

| 2θ | d | Relative Intensity |
|---|---|---|
| 8.5–8.6 | 10.40–10.28 | m–s |
| 20.2–20.3 | 4.40–4.37 | m |
| 21.9–22.1 | 4.06–4.02 | w–m |
| 22.6–22.7 | 3.93–3.92 | vs |
| 31.7–31.8 | 2.823–2.814 | w–m |

All of the as-synthesized SAPO-31 compositions for which X-ray powder diffraction data have presently been obtained have patterns which are within the generalized pattern of Table IV below.

TABLE IV

| 2θ | d | 100 × $I/I_o$ |
|---|---|---|
| 6.1 | 14.5 | 0–1 |
| 8.5–8.6* | 10.40–10.28 | 60–72 |
| 9.5* | 9.31 | 7–14 |
| 13.2–13.3* | 6.71–6.66 | 1–4 |
| 14.7–14.8 | 6.03–5.99 | 1–2 |
| 15.7–15.8* | 5.64–5.61 | 1–8 |
| 17.05–17.1 | 5.20–5.19 | 2–4 |
| 18.3–18.4 | 4.85–4.82 | 2–3 |
| 20.2–20.3 | 4.40–4.37 | 44–55 |
| 21.1–21.2* | 4.21–4.19 | 6–28 |
| 21.9–22.1* | 4.06–4.02 | 32–38 |
| 22.6–22.7* | 3.93–3.92 | 100 |
| 23.3–23.35* | 3.818–3.810 | 2–20 |
| 25.1* | 3.548 | 3–4 |
| 25.65–25.75 | 3.473–3.460 | 2–3 |
| 26.5* | 3.363 | 1–4 |
| 27.9–28.0 | 3.198–3.187 | 8–10 |
| 28.7* | 3.110 | 0–2 |
| 29.7 | 3.008 | 4–5 |
| 31.7–31.8 | 2.823–2.814 | 15–18 |
| 32.9–33.0* | 2.722–2.714 | 0–3 |
| 35.1–35.2 | 2.557–2.550 | 5–8 |
| 36.0–36.1 | 2.495–2.488 | 1–2 |
| 37.2 | 2.417 | 1–2 |
| 37.9–38.1* | 2.374–2.362 | 2–4 |
| 39.3 | 2.292 | 2–3 |
| 43.0–43.1* | 2.103–2.100 | 1 |
| 44.8–45.2* | 2.023–2.006 | 1 |
| 46.6 | 1.949 | 1–2 |
| 47.4–47.5 | 1.918 | 1 |
| 48.6–48.7 | 1.873–1.870 | 2 |
| 50.7–50.8 | 1.801–1.797 | 1 |
| 51.6–51.7 | 1.771–1.768 | 2–3 |
| 55.4–55.5 | 1.658–1.656 | 1 |

*Possibly contains peak from a minor impurity

SAPO-41, as referred to herein, comprises a silocoaluminophosphate having a three-dimensional microporous crystal framework structure of [PO$_2$], [AlO$_2$] and [SiO$_2$] tetrahedral units, and whose unit empirical formula on an anhydrous basis is:

mR:(Si$_x$Al$_y$P$_z$)O$_2$ wherein R represents at least one organic templating agent present in the intracrystalline pore system; "m" represents the moles of "R" present per mole of (Si$_x$Al$_y$P$_z$)O$_2$ and has a value of from zero to 0.3; "x", "y" and "z" represent respectively, the mole fractions of silicon, aluminum and phosphorus, said mole fractions being within the compositional area bounded by points A, B, C, D and E on the ternary diagram which is FIG. 1, or preferably within the area bounded by points a, b, c, d and e on the ternary diagram which is FIG. 2, said silicoaluminophosphate having a characteristic X-ray powder diffraction pattern (as-synthesized and calcined) which contains at least the d-spacings set forth below in Table V. When SAPO-41 is in the as-synthesized form "m" preferably has a value of from 0.02 to 0.3.

TABLE V

| 2θ | d | Relative Intensity |
|---|---|---|
| 13.6–13.8 | 6.51–6.42 | w–m |
| 20.5–20.6 | 4.33–4.31 | w–m |
| 21.1–21.3 | 4.21–4.17 | vs |
| 22.1–22.3 | 4.02–3.99 | m–s |
| 22.8–23.0 | 3.90–3.86 | m |
| 23.1–23.4 | 3.82–3.80 | w–m |
| 25.5–25.9 | 3.493–3.44 | w–m |

All of the as-synthesized SAPO-41 compositions for which X-ray powder diffraction data have presently been obtained have patterns which are within the generalized pattern of Table VI below.

TABLE VI

| 2θ | d | 100 × $I/I_o$ |
|---|---|---|
| 6.7–6.8 | 13.19–12.99 | 15–24 |
| 9.6–9.7 | 9.21–9.11 | 12–25 |
| 13.6–13.8 | 6.51–6.42 | 10–28 |
| 18.2–18.3 | 4.87–4.85 | 8–10 |
| 20.5–20.6 | 4.33–4.31 | 10–32 |
| 21.1–21.3 | 4.21–4.17 | 100 |
| 22.1–22.3 | 4.02–3.99 | 45–82 |
| 22.8–23.0 | 3.90–3.87 | 43–58 |
| 23.1–23.4 | 3.82–3.80 | 20–30 |
| 25.2–25.5 | 3.53–3.49 | 8–20 |
| 25.5–25.9 | 3.493–3.44 | 12–28 |
| 29.3–29.5 | 3.048–3.028 | 17–23 |
| 31.4–31.6 | 2.849–2.831 | 5–10 |
| 33.1–33.3 | 2.706–2.690 | 5–7 |
| 37.6–37.9 | 2.392–2.374 | 10–15 |
| 38.1–38.3 | 2.362–2.350 | 7–10 |
| 39.6–39.8 | 2.276–2.265 | 2–5 |
| 42.8–43.0 | 2.113–2.103 | 5–8 |
| 49.0–49.3 | 1.856–1.848 | 1–8 |
| 51.5 | 1.774 | 0–8 |

When used in the present process, the silicoaluminophosphates are employed in admixture with at least one Group VIII metal as for example the noble metals such as platinum, and palladium and optionally other catalytically active metals such as molybdenum, vanadium, zinc, etc. The amount of metal ranges from about 0.01% to 10% and preferably 0.2 to 5% by weight of the molecular sieve. The techniques of introducing catalytically active metals to a molecular sieve are disclosed in the literature, and preexisting metal incorporation techniques and treatment of the molecular sieve to form an active catalyst are suitable, e.g., ion exchange, impregnation or by occlusion during sieve preparation. See, for example, U.S. Pat. Nos. 3,236,761, 3,226,339, 3,236,762, 3,620,960, 3,373,109, 4,202,996 and 4,440,871 which patents are incorporated totally herein by reference.

The Group VIII metal utilized in the process of this invention can mean one or more of the metals in its elemental state or in some form such as the sulfide or oxide and mixtures thereof. As is customary in the art of catalysis, when referring to the active metal or metals it is intended to encompass the existence of such metal in the elementary state or in some form such as the oxide or sulfide as mentioned above, and regardless of the state in which the metallic component actually exists the concentrations are computed as if they existed in the elemental state.

The physical form of the silicoaluminophosphate catalyst depends on the type of catalytic reactor being employed and may be in the form of a granule or powder, and is desirably compacted into a more readily usable form (e.g., larger agglomerates), usually with a silica or alumina binder for fluidized bed reaction, or pills, prills, spheres, extrudates, or other shapes of controlled size to accord adequate catalyst-reactant contact. The catalyst may be employed either as a fluidized catalyst, or in a fixed or moving bed, and in one or more reaction stages.

Process Conditions

The catalytic dewaxing step of this invention may be conducted by contacting the feed to be dewaxed with a fixed stationary bed of catalyst, with a fixed fluidized bed, or with a transport bed, as desired. A simple and therefore preferred configuration is a trickle-bed operation in which the feed is allowed to trickle through a stationary fixed bed, preferably in the presence of hydrogen. The catalytic dewaxing conditions are dependent in large measure on the feed used and upon the desired pour point. Generally, the temperature will be between about 200° C. and about 475° C., preferably between about 250° C. and about 450° C. The pressure is typically between about 15 psig and about 3000 psig, preferably between about 200 psig and 3000 psig. The liquid hourly space velocity (LHSV) preferably will be form 0.1 to 20, preferably between about 0.2 and about 10.

Hydrogen is preferably present in the reaction zone during the catalytic dewaxing process. The hydrogen to feed ratios is typically between about 500 and about 30,000 SCF/bbl (standard cubic feet per barrel), preferably about 1000 to about 20,000 SCF/bbl. Generally, hydrogen will be separated from the product and recycled to the reaction zone.

The silicoaluminophosphate molecular sieve catalysts can be manufactured into a wide variety of physical forms. Generally speaking, the molecular sieves can be in the form of a powder, a granule, or a molded product, such as extrudate having particle size sufficient to pass through a 2-mesh (Tyler) screen and be retained on a 40-mesh (Tyler) screen. In cases where the catalyst is molded, such as by extrusion with a binder, the silicoaluminophosphate can be extruded before drying, or, dried or partially dried and then extruded.

The molecular sieve can be composited with other materials resistant to the temperatures and other conditions employed in the dewaxing process. Such matrix materials include active and inactive materials and synthetic or naturally occurring zeolites as well as inorganic materials such as clays, silica and metal oxides. The latter may be either naturally occurring or in the form of gelatinous precipitates, sols or gels including mixtures of silica and metal oxides. Inactive materials suitably serve as diluents to control the amount of conversion in the dewaxing process so that products can be obtained economically without employing other means for controlling the rate of reaction. The silicoaluminophosphates may be incorporated into naturally occurring clays, e.g., bentonite and kaolin. These materials, i.e., clays, oxides, etc., function, in part, as binders for the catalyst. It is desirable to provide a catalyst having good crush strength, because in petroleum refining the catalyst is often subjected to rough handling. This tends to break the catalyst down into powder-like materials which cause problems in processing.

Naturally occurring clays which can be composited with the silicoaluminophosphate include the montmorillonite and kaolin families, which families include the sub-bentonites, and the kaolins commonly known as Dixie, McNamee, Georgia and Florida clays or others in which the main mineral constituent is halloysite, kaolinite, dickite, nacrite, or anauxite. Fibrous clays such as halloysite, sepiolite and attapulgite can also be used as supports. Such clays can be used in the raw state as originally mined or initially subjected to calcination, acid treatment or chemical modification.

In addition to the foregoing materials, the silicoaluminophosphates can be composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina-titania, silica-alumina-magnesia and silica-magnesia-zirconia. The matrix can be in the form of a cogel.

The silicoaluminophosphate catalysts used in the process of this invention can also be composited with other zeolites such as synthetic and natural faujasites, (e.g., X and Y) erionites, and mordenites. They can also be composited with purely synthetic zeolites such as those of the ZSM series. The combination of zeolites can also be composited in a porous inorganic matrix.

The improved process of this invention will now be illustrated by examples which are not to be construed as limiting the invention as described in this specification including the attached claims.

EXAMPLES

EXAMPLE 1

SAPO-11 was grown according to U.S. Pat. No. 4,440,871 and identified by such as X-ray diffraction analysis. Elemental analysis of the calcined sieve showed it to have the following anhydrous molar composition:

$$0.16 SiO_2 : Al_2O_3 : P_2O_5.$$

The sieve was bound with 35% Catapal alumina and made into 1/16-inch extrudate. The extrudate was dried four hours at 250° F., calcined in air for four hours at 850° F., then impregnated with 1 weight percent Pt (as $Pt(NH_3)_4Cl_2 \cdot H_2O$) by the pore-fill method. It was then dried overnight at 275° F. and calcined in air for eight hours at 850° F.

EXAMPLE 2

Figure 3:
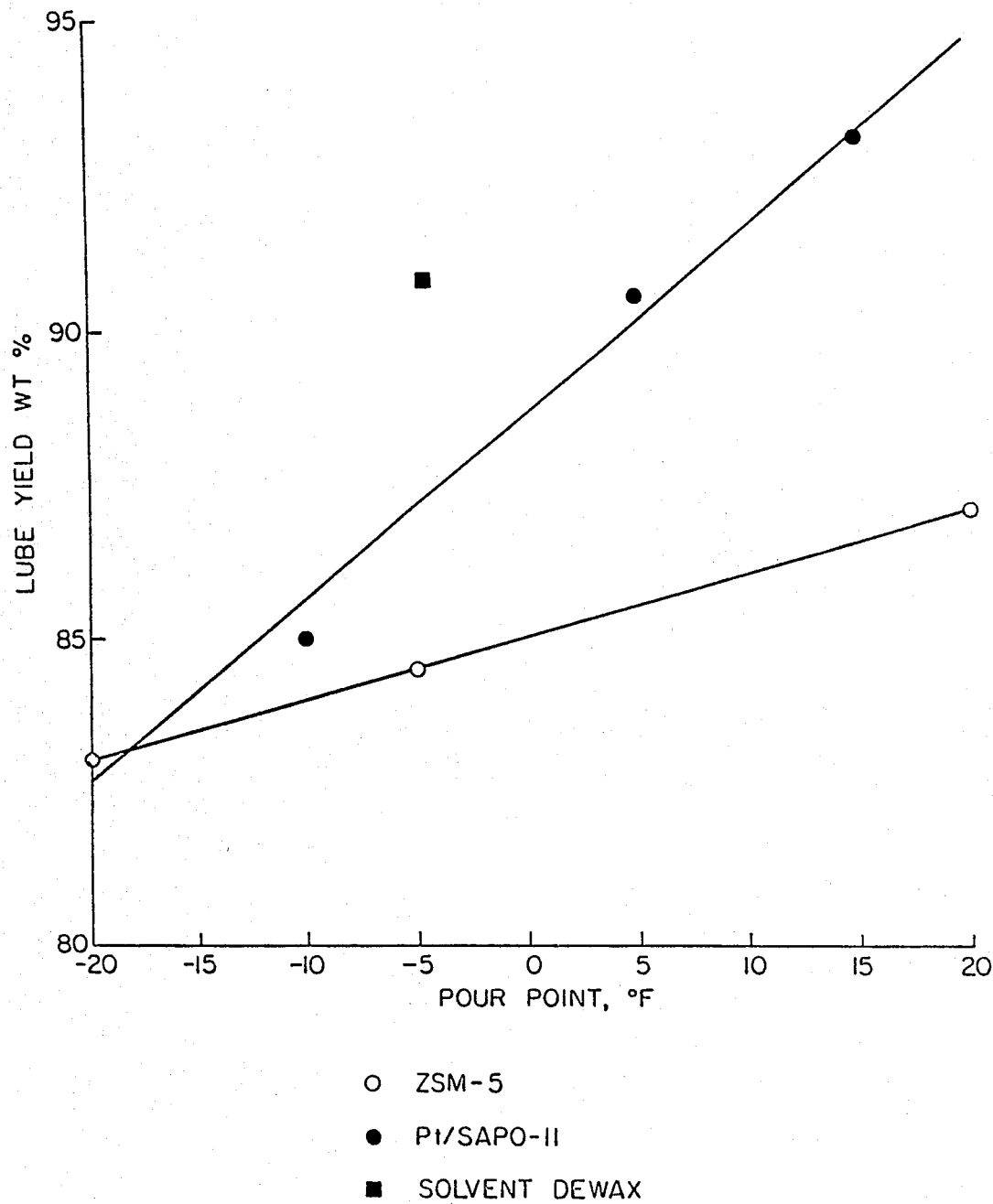
FIG. 3 is a graph showing a comparison for a crystalline silicoaluminophosphate catalyst used in the process of this invention and a ZSM-5 catalyst with respect to lube yield at a given pour point in a dewaxing process.

The Pt/SAPO-11 catalyst of Example 1 was tested for dewaxing a +75° F. pour point lube oil (inspections given in Table VII) at 1 LHSV, 2200 psig, and 8M SCF/bbl once-through $H_2$. The pour point could be lowered to +15° F. at a catalyst temperature of 640° F. Pour point reduction could be increased by raising the catalyst temperature. FIG. 3 compares the 700° F.+ lube yield for the catalyst of this invention with that for a conventional ZSM-5 catalyst containing 35% Catapal binder and run at the same space velocity, pressure, and $H_2$ rate. Here 700° F.+ lube yield is defined as:

$$1 - \frac{g\ 700°\ F.+\ (feed) - g\ 700°\ F.+\ (product)}{g\ 700°\ F.+\ (feed)} \times 100\%$$

Figure 4:
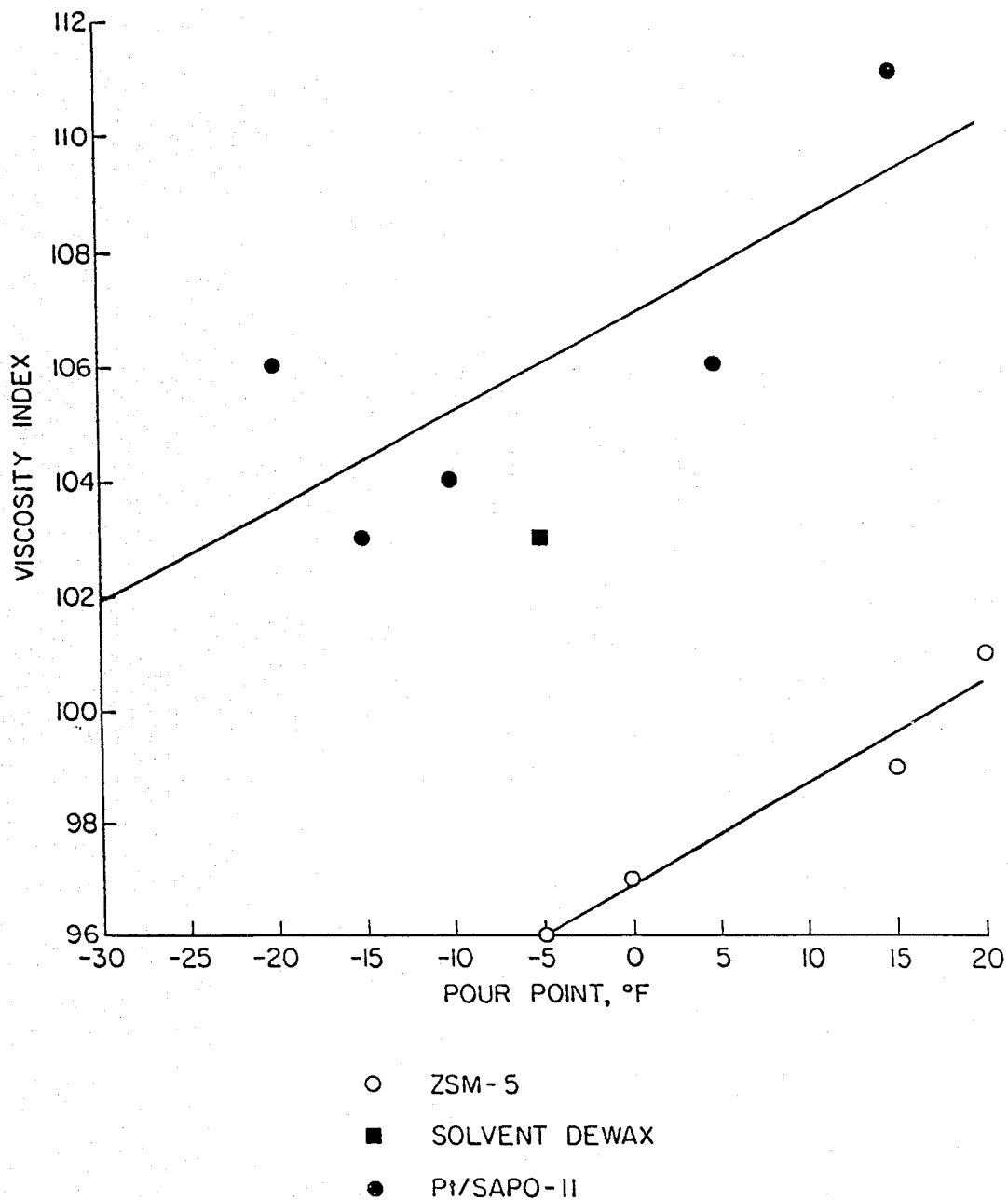
FIG. 4 is a graph showing a comparison for a crystalline silicoaluminophosphate catalyst used in the process of this invention and a ZSM-5 catalyst with respect to viscosity index at a given pour point in a dewaxing process.
Figure 5:
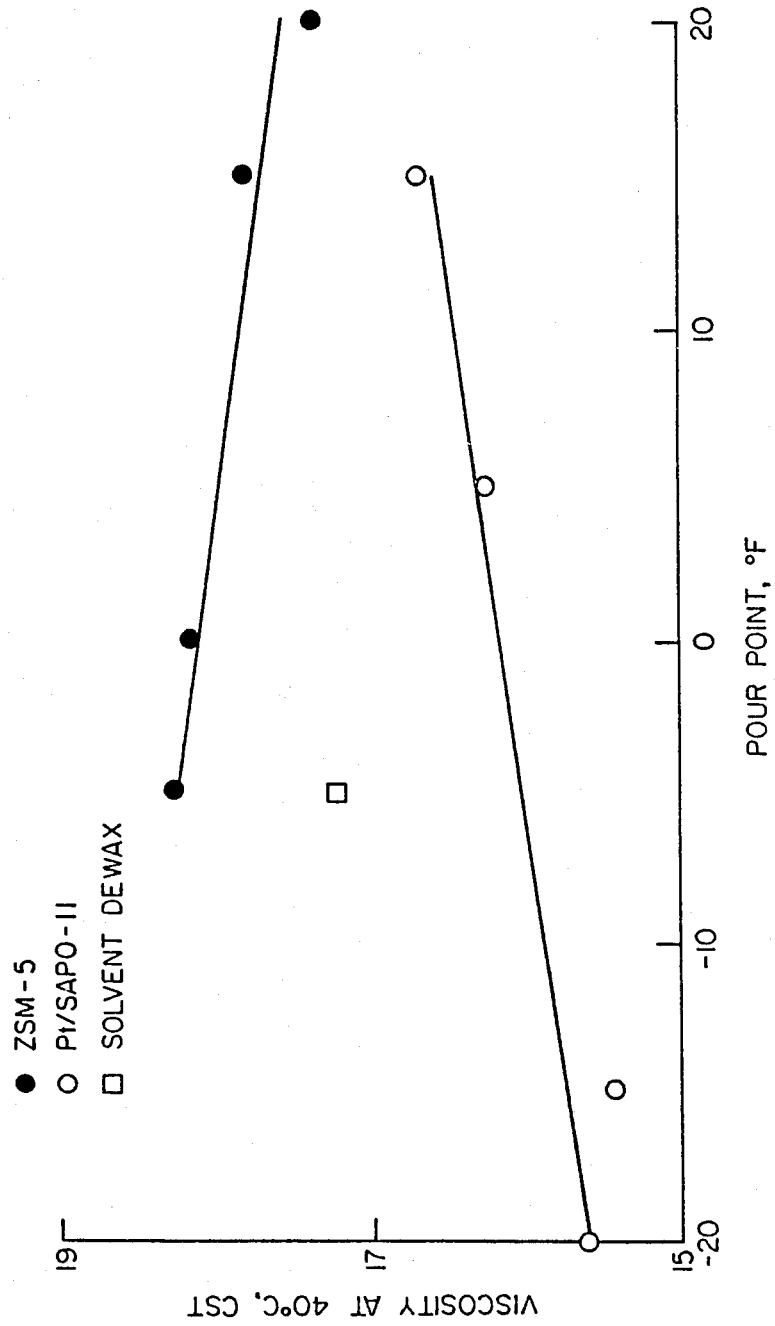
FIG. 5 is a graph showing a comparison for a crystalline silicoaluminophosphate catalyst used in the process of this invention and a ZSM-5 catalyst with respect to viscosity at a given pour point in a dewaxing process.

The figure shows a marked advantage in terms of greater yield for the SAPO-11 catalyst. A large viscosity index (VI) advantage was also found (FIG. 4) as was a lower viscosity (FIG. 5).

TABLE VII

+75° F. Pour Point Lube Oil

| | |
|---|---|
| Gravity, °API | 33.9 |
| Aniline Point, °F. | 216.6 |
| Sulfur, ppm | 1.3 |
| Nitrogen, ppm | 0.3 |
| Pour Point, °F. | +75 |
| Viscosity, CS, 100° C. | 3.610 |
| P/N/A/S, LV % | 27.6/61.6/10.8/0 |
| Simulated Distillation, LV %, °F. | |
| ST/5 | 347/641 |
| 10/30 | 671/725 |
| 50 | 759 |
| 70/90 | 788/824 |
| 95/EP | 839/866 |

EXAMPLE 3

The Pt/SAPO-11 catalyst of Example 1 was used to dewax a +115° F. pour point lube oil (inspections given in Table VIII) at 1 LHSV, 2200 psig, and 8M SCF/bbl H$_2$. Table IX compares the results versus those with the same ZSM-5 catalyst described in Example 2, again showing a major advantage for the SAPO-11 catalyst.

TABLE VIII

+115° F. Pour Point Lube Oil

| | |
|---|---|
| Gravity, °API | 36.6 |
| Sulfur, ppm | 1.5 |
| Nitrogen, ppm | 0.2 |
| Pour Point, °F. | +115 |
| Viscosity, CS, 100° C. | 5.307 |
| Flash Point, °F. | 435 |
| P/N/A/S/ LV % | 37.4/57.4/5.2/0 |
| Simulated Distillation, LV %, ° F. | |
| ST/5 | 120/716 |
| 10/30 | 744/803 |
| 50 | 849 |
| 70/90 | 893/953 |
| 95/EP | 982/1035 |

TABLE IX

Dewaxing +115° F. Pour Point Lube Oil at 1 LHSV, 2200 psig, and 8M SCF/bbl H$_2$

| Catalyst | Pt/SAPO-11 (Example 1) | | | ZSM-5 | |
|---|---|---|---|---|---|
| Catalyst Temperature, °F. | 700 | 725 | 750 | 683 | 713 |
| Pour Point, °F. | +50 | +25 | +10 | +5 | −20 |
| Viscosity, CS, 40° C. | 27.41 | 27.87 | 26.78 | 35.00 | 35.03 |
| Viscosity, CS, 100° C. | 5.520 | 5.513 | 5.348 | 6.032 | 5.939 |
| VI | 144 | 139 | 138 | 118 | 114 |
| 700° F.+ Lube Yield, Wt % | 86.5 | 79.3 | 65.0 | 55.4 | 48.0 |

EXAMPLE 4

The following catalysts were compared for dewaxing a +100° F. pour point lube oil (inspections given in Table X) at 1 LHSV, 2200 psig, and 8M SCF/bbl H$_2$.
(a) the Pt/SAPO-11 catalyst of Example 1
(b) the ZSM-5 catalyst of Example 2
(c) a ZSM-5 catalyst similar to that of Example 2 but impregnated with 0.8 wt % Pt.

TABLE X

+100° F. Pour Point Lube Oil

| | |
|---|---|
| Gravity, °API | 34.0 |
| Aniline Point, °F. | 244.0 |
| Sulfur, ppm | 0.4 |
| Nitrogen, ppm | 0.1 |
| Pour Point, °F. | +100 |
| Viscosity, CS, 100° C. | 6.195 |
| Flash Point, °F. | 420 |
| P/N/A/S, LV % | 25.0/62.1/12.8/0 |
| Simulated Distillation, LV %, °F. | |
| ST/5 | 313/770 |
| 10/30 | 794/841 |
| 50 | 873 |
| 70/90 | 908/968 |
| 95/EP | 998/1061 |

Table XI shows advantages for the Pt/SAPO-11 in both yield and VI. It also shows this catalyst to produce much less C$_4$— gas in the cracked product.

TABLE XI

| Catalyst | Pt/SAPO-11 | | | ZSM-5 | | Pt/ZSM-5 | |
|---|---|---|---|---|---|---|---|
| Catalyst Temperature, °F. | 690 | 725 | 750 | 650 | 670 | 580 | 610 |
| Pour Point, °F. | +30 | +15 | +5 | +30 | +5 | +30 | +5 |
| Viscosity, CS, 40° C. | 34.99 | 36.65 | 35.91 | 45.66 | 50.33 | 46.72 | 49.83 |
| Viscosity, CS, 100° C. | 6.234 | 6.372 | 6.272 | 7.124 | 7.491 | 7.235 | 7.419 |
| VI | 128 | 125 | 125 | 115 | 111 | 115 | 111 |
| 800° F.+ Lube Yield, Wt % | 79.0 | 77.5 | 68.0 | 77 | 69 | 78 | 71 |
| P/N/A, LV % | 29.3/65.3/5.4 | | | | | 14.3/78.8/6.9 | |
| P/N/A, ndM | 77.60/22.34/0.07 | | | | | 73.21/26.79/0.00 | |
| Simulated Distillation, LV %, °F. | | | | | | | |
| ST/5 | 718/769 | 731/775 | 723/770 | 731/784 | 739/788 | 631/767 | 717/779 |
| 10/30 | 793/842 | 796/841 | 791/838 | 806/850 | 808/851 | 792/841 | 801/876 |
| 50 | 875 | 874 | 872 | 881 | 882 | 874 | 896 |
| 70/90 | 909/967 | 909/968 | 906/965 | 914/971 | 915/974 | 909/969 | 918/973 |
| 95/EP | 995/1062 | 998/1064 | 995/1060 | 999/1067 | 1003/1064 | 999/1062 | 1003/1061 |
| Catalyst Temperature, °F. Cracked Product | 690 | 725 | 750 | 650 | 670 | 580 | 610 |

TABLE XI-continued

| Catalyst | Pt/SAPO-11 | ZSM-5 | Pt/ZSM-5 |
|---|---|---|---|
| Selectivity, Wt % | | | |
| $C_4-$ | 10.7 | | 53.4 |
| $C_5-350°$ F. | 18.7 | | 39.7 |
| 350–550° F. | 25.7 | | 6.9 |
| 550–800° F. | 44.9 | | 0 |

EXAMPLE 5

Another batch of SAPO-11 was prepared similarly to that of Example 1, except that the molar composition of the anhydrous sieve was:

$$0.4SiO_2:Al_2O_3:P_2O_5.$$

This sieve was bound with alumina and impregnated with 1 weight percent Pt as in Example 1.

EXAMPLE 6

The catalyst of Example 5 was used to dewax the lube oil of Table Vii. The results (Table XII) again show the advantage of Pt/SAPO-11 for obtaining high lube yield and VI, as well as low vicosity.

TABLE XII

| | Dewaxing +75° F. Pour Point Lube Oil at 1 LHSV, 2200 psig, and 8M SCF/bbl $H_2$ | | | |
|---|---|---|---|---|
| Catalyst | Pt/SAPO-11 (Example 5) | | ZSM-5 | |
| Catalyst Temperature, °F. | 650 | 675 | 606 | 621 |
| Pour Point, °F. | −10 | −10 | +20 | −5 |
| Viscosity, CS, 40° C. | 16.79 | 16.88 | 17.33 | 18.26 |
| Viscosity, CS, 100° C. | 3.689 | 3.693 | 3.729 | 3.812 |
| VI | 105 | 104 | 101 | 96 |
| 700° F.+ Lube Yield, Wt % | 91.0 | 87.0 | 87.0 | 84.5 |

EXAMPLE 7

The catalyst of Example 5 was used to dewax the lube oil of Table X. The results are shown in Table Xiii.

TABLE XIII

| | Dewaxing +100° F. Pour Point Lube Oil at 1 LHSV, 2200 psig, and 8M SCF/bbl $H_2$ | | | |
|---|---|---|---|---|
| Catalyst | Pt/SAPO-11 (Example 5) | | ZSM-5 | |
| Catalyst Temperature, °F. | 700 | 725 | 650 | 670 |
| Pour Point, °F. | +15 | +5 | +30 | +5 |
| Viscosity, CS, 40° C. | 36.94 | 34.54 | 45.66 | 50.33 |
| Viscosity, CS, 100° C. | 6.362 | 6.083 | 7.124 | 7.491 |
| VI | 123 | 124 | 115 | 111 |
| 800° F.+ Lube Yield, Wt % | 78 | 69 | 77 | 69 |

What is claimed is:

1. A process for dewaxing a hydrocarbon oil feedstock boiling above 350° F. and containing straight chain and slightly branched chain hydrocarbons comprising contacting said feedstock under mild cracking and isomerization conditions including a pressure of from about 15 psig to about 3000 psig with a catalyst comprising SAPO-11 and a Group VIII metal selected from the group consisting of platinum and palladium.

2. The method of claim 1 wherein the metal is platinum.

3. The method of claim 1 wherein the Group VIII metal is present in the range of 0.01% to 10% based on the weight of molecular sieve.

4. The process of claim 1 wherein said process is conducted at a temperature of from about 200° C. to 475° C., a pressure of about 15 psig to about 3000 psig, a liquid hourly space velocity of from about 0.1 hr$^{-1}$ to about 20 hr$^{-1}$, a hydrogen circulation rate of from 500 to about 30,000 SCF/bbl.

5. The process of claim 1 wherein the feedstock is a middle distillate oil.

6. The process of claim 1 wherein the feedstock is a lube oil.

7. The process of claim 1 wherein the feedstock contains less than 50 ppm of nitrogen.

8. The process of claim 1 wherein the feedstock contains less than 10 ppm of nitrogen.

9. A process of claim 1 wherein the feedstock is a hydroprocessed feedstock.

10. The process of claim 4 or 1 wherein said pressure is between about 200 psig and 3000 psig.

* * * * *